Jan. 30, 1962  W. J. COYLE  3,019,008
WIRE SHOCK MOUNT
Filed Nov. 16, 1960
Fig. 1.
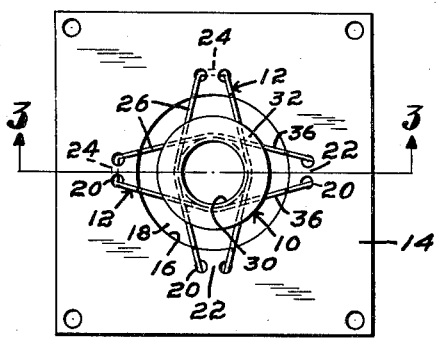
Fig. 2.
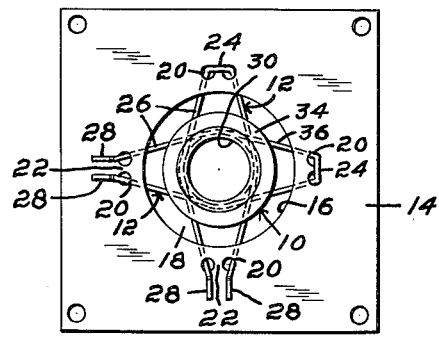
Fig. 3.
Fig. 4.
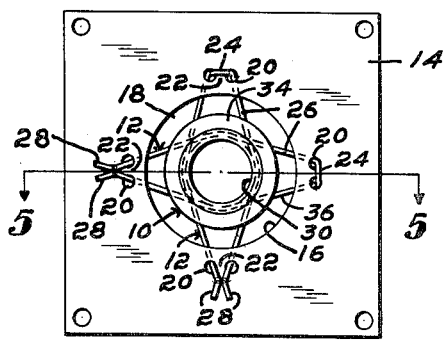
Fig. 5.
Inventor:
William J. Coyle,
by Walter P. Jones
Atty.

United States Patent Office 3,019,008
Patented Jan. 30, 1962

3,019,008
WIRE SHOCK MOUNT
William J. Coyle, Waltham, Mass., assignor to United-Carr Fastener Corporation, Cambridge, Mass., a corporation of Delaware
Filed Nov. 16, 1960, Ser. No. 69,598
3 Claims. (Cl. 267—1)

This invention relates to shock mounts and more specifically to shock mounts utilizing wire damper springs.

An object of the invention is to provide new, simple, inexpensive and improved damper springs.

A further object of this invention is to provide generally U-shaped damper springs with freely moveable terminal ends.

Other objects of the invention will, in part, be obvious, and will, in part, appear hereinafter.

In the drawings:
FIG. 1 is a top plan view of the mount;
FIG. 2 is a bottom plan view of the mount;
FIG. 3 is a section taken on the line 3—3 of FIG. 1;
FIG. 4 is a bottom plan view of the mount under an axial force; and
FIG. 5 is a section taken on line 5—5 of FIG. 4.

Referring to the drawing, there is shown a shock mount comprising a columnar member 10, a pair of clamping springs 12 and a mounting plate 14, said mounting plate 14 having an inner wall 16 defining a circular mounting aperture 18. Portions of said mounting plate 14 having a series of paired holding walls 20 defining comparatively small diameter circular apertures which are located at said portions around the circumference nearly adjacent said inner wall 16, as shown in FIGS. 1 and 2, and said pairs of holding walls 20 are connected at one point by a connecting element 22.

Each of said damping springs 12 are formed of a resilient material such as wire, and comprises a generally U-shaped bight portion 24 connecting, in integral spaced relationship, a pair of legs 26 having free extremities 28. Said columnar member 10 comprises a tubular core element 30, a flange portion 32 in integral substantially right angle relationship with said core element 30 and a companion flange portion 34 in substantially right angle relationship with said core element 30 and in spaced parallel relationship with said flange portion 32 as shown in FIGS. 3 and 5. Both said flange portion 32 and said companion flange portion 34 may be of a circular configuration and may have apertures formed therein or means for holding the object to be protected.

The columnar member 10, damping springs 12 and mounting plate 14 are combined to form the mount by passing each of the legs 26 of one of said mounting springs 12 between one of said pairs of holding walls 20 until said bight portion abuts said connecting element 22 lying between the concerned holding walls 20, said legs 26 on the opposite side of said mounting plate 14 from said bight portion are bent at an angle to form support portions 36 which lie on a plane in spaced relation to the plane of said mounting plate 14 over the area circumscribed by said inner wall 16 while remaining in spaced relation to each other. The legs 26 are bent again at a predetermined point toward said mounting plate 14 and said free extremities 28 are each passed between one of said holding walls 20 opposite to the original pair of holding walls 20. In this position said free extremities 28 lie a predetermined distance beyond the plane of said mounting plate 14 on the opposite side of said mounting plate from that of said support portions 36, said free extremities 28 being bent back toward said mounting plate 14 until a portion of said free extremities 28 abut against said mounting plate. The legs 26 can now be spread apart and its support portion 36 passed between said flange portion 32 and said companion flange portion 34 whereby a portion of said core element is sandwiched between said support portions 36 as shown in FIG. 2. The other damping spring 12 is engaged in a similar manner at approximately right angles to the first damping spring 12 whereby a portion of its support portions 36 overlies and abuts a similar part of the other. Said columnar member 10 is now suspended on the damping springs on a plane in spaced relation to the plane of said mounting plate 14 and over the area circumscribed by said inner wall 16 as shown in FIG. 3.

An axial force, such as a vibration or shock, directed in a line parallel to the axis of said columnar member would cause either the flange portion 32 or the companion flange portion 34 to bear against the support portions 36. If the force was moving in a direction from the flange portion 32 toward the companion flange portion 34, the support portions 36 would first move with the force bending the legs close to the points where the bends forming the support portions 36 were made, as shown at FIG. 5, at the same time the free extremities 28 and the bight portions 24 would tend to move away from the axis of the mounting aperture 18, which movement would cause a frictional sliding engagement between said free extremities 28 and said mounting plate 14 and between said bight portions and said connecting elements because of the fact that the dimensions of the spring portions to the apertures in the plate are such as to permit a predetermined movement. The resiliency of the legs 26 and the frictional forces heretofore mentioned, would tend to absorb and damp the potentially damaging vibrations or shocks to which the mount was subject.

Since certain other obvious modifications may be made in this device without departing from the scope of the invention, it is intended that all matter contained herein be interpreted in an illustrative and not in a limiting sense.

I claim:
1. A shock mount comprising a mounting plate, a relatively movable supporting member and a plurality of wire damping springs, each of said damping springs comprising a U-shaped body having free terminal ends and a bight portion, said terminal ends and said bight portion moveably engaging said mounting plate, said supporting member having means engaging an intermediate portion of said damping springs.

2. The shock mount of claim 1 wherein said supporting member lies on a plane in spaced parallel relationship with the plane of said mounting plate.

3. A shock mount comprising a mounting plate, a relatively movable supporting member and a wire damping spring, said damping spring comprising a U-shaped body having free terminal ends and a bight portion, said terminal ends and said bight portion movably engaging said mounting plate, said supporting member having means engaging an intermediate portion of said damping spring.

References Cited in the file of this patent
UNITED STATES PATENTS
2,096,205   Smith ------------------ Oct. 19, 1937
2,716,011   Steimen ---------------- Aug. 23, 1955